(12) United States Patent
Wang et al.

(10) Patent No.: US 7,429,713 B2
(45) Date of Patent: Sep. 30, 2008

(54) METHOD FOR IMPROVING SINGLE SIDED RESISTANCE SPOT WELDS

(75) Inventors: Pei-Chung Wang, Troy, MI (US); James F. Hengel, Romeo, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/341,785

(22) Filed: Jan. 27, 2006

(65) Prior Publication Data

US 2007/0175867 A1 Aug. 2, 2007

(51) Int. Cl.
*B23K 11/10* (2006.01)
(52) U.S. Cl. .................................... 219/86.9; 219/91.2
(58) Field of Classification Search .............. 219/117.1, 219/59.1, 61, 67, 86.1, 86.9, 91.2
See application file for complete search history.

(56) References Cited

U.S. PATENT DOCUMENTS

| | | | | |
|---|---|---|---|---|
| 2,345,037 A * | 3/1944 | De Gray | ................. | 219/137 R |
| 2,544,335 A * | 3/1951 | Linnert | ....................... | 428/594 |
| 3,576,963 A * | 5/1971 | Vowels | ......................... | 219/92 |
| 4,524,898 A * | 6/1985 | Renshaw | ..................... | 228/1.1 |
| 4,689,465 A * | 8/1987 | Pal | ........................... | 219/117.1 |
| 4,749,833 A * | 6/1988 | Novorsky et al. | ........... | 219/603 |
| 6,373,021 B1 * | 4/2002 | Wang et al. | ................... | 219/93 |
| 6,713,707 B2 * | 3/2004 | Gabbianelli et al. | ........... | 219/94 |
| 6,765,170 B2 * | 7/2004 | Chen et al. | ................. | 219/59.1 |
| 6,836,948 B2 * | 1/2005 | Wang | ......................... | 29/432.1 |
| 7,053,330 B2 * | 5/2006 | Wang et al. | .................. | 219/93 |
| 2006/0134450 A1 * | 6/2006 | Sigler et al. | ................. | 428/621 |

* cited by examiner

*Primary Examiner*—Kevin P Kerns

(57) ABSTRACT

A method of improving a single-sided resistance spot weld includes forming an adhesive bond between a sheet and a tube to thereby form a two-ply structure by which the sheet metal and the tube wall stiffen each other against bending. The adhesive bond is preferably formed by heat curable adhesive and the adhesive is partially cured by applying the electrode to a spot on the sheet and then conducting current through the electrode to induce electric resistance heating in the sheet and tube to cure the adhesive. After the adhesive bond is formed, the electrode is moved to a new spot on the sheet and then forcibly applied against the stiffened sheet and resistance welding current is applied through the electrode to form a resistance spot weld between the stiffened sheet and the stiffened tube wall.

19 Claims, 2 Drawing Sheets

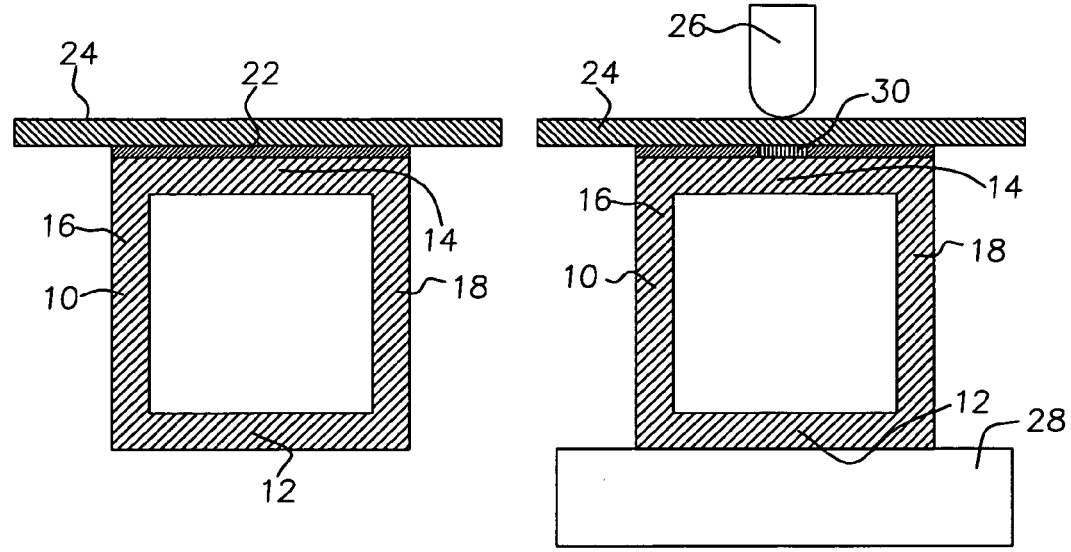
FIG. 1
FIG. 2
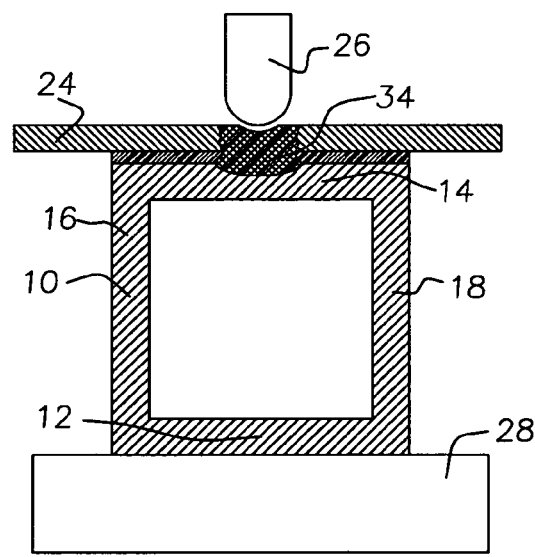
FIG. 3

METHOD FOR IMPROVING SINGLE SIDED RESISTANCE SPOT WELDS

FIELD OF THE INVENTION

The present invention relates to the use of a single-sided electric resistance spot weld to attach a sheet of metal to a tube.

BACKGROUND OF THE INVENTION

It is well known in the automobile and other industries to manufacture a load bearing structural frame comprised of tubes, and to subsequently weld sheet metal panels to the tubes. The welding of sheet metal to a closed tubular structure is commonly achieved via a single-sided spot welding process for the reason that the closed tubular structure does not permit the use of opposed acting electrodes to pinch together the metal surfaces as is the case of traditional two sided resistance spot welds. In the single-sided welding process, the sheet is placed against the tube, with the tube resting upon a back-up electrode. The welding electrode is then placed against the sheet metal. Weld current is conducted through to the electrode and the current passes through the sheet, and through the tube to the backup electrode that underlies the tube. A weld nugget is formed beneath the weld electrode, to weld the metal sheet to the adjacent surface of the tube.

It is characteristic of the single-sided welding process that the electrode must be applied to the sheet metal with considerable force so that the sheet metal and the tube are forcibly pressed together during the application of weld current in order to form a high quality spot weld between the sheet metal and the tube. It is accordingly necessary and desirable that the tube have metal thicknesses sufficiently stiff to resist bending thereof by the force applied by the electrode. This resistance to bending is particularly useful to obtaining high quality welds in the case of the single-sided welding of a sheet and tube where one of both of the sheet and tube is a galvanized metal. In the heat cycle of the welding of galvanized metals, the zinc element of the galvanized coating enters into the grain boundaries of the iron and the zinc remains in a liquid state at a temperature below the re-solidification temperature of the iron so that the zinc and iron may be at different conditions of re-solidification upon occurrence of unbending of the tube wall when the electrode pressure is removed at the end of the weld cycle.

It would be desirable to provide improvements in the afore described method of single-sided resistance spot welding a sheet to a tube in order to facilitate formation of high quality welds even without necessitating the use of heavy gauge tube wall thicknesses.

SUMMARY OF THE INVENTION

A method of improving a single-sided resistance spot weld includes forming an adhesive bond between the sheet and the tube to thereby form a two-ply structure by which the sheet metal and the tube wall stiffen each other against bending. The adhesive bond is preferably formed by a heat curable adhesive and the adhesive is partially cured by applying the electrode to a spot on the sheet and then conducting current through the electrode to induce electric resistance heating in the sheet and tube to cure the adhesive. After the adhesive bond is formed, the electrode is moved to a new spot on the sheet and then forcibly applied against the stiffened sheet and the resistance welding current is applied through the electrodes to form a resistance spot weld between the stiffened sheet and the stiffened tube wall.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a section view taken through a metal sheet laid atop a rectangular tube with adhesive interposed between the sheet and the tube;

FIG. 2 is a section view similar to FIG. 1 but showing an electrode applied to a spot on the sheet to induce electric resistance heating and curing of an adhesive spot;

FIG. 3 is a view similar to FIG. 2 but showing the electrode relocated to the location of FIG. 2 and the application of the resistance spot welding current to form a resistance spot weld between the sheet and the tube;

DETAILED DESCRIPTION OF THE EXEMPLARY EMBODIMENTS

Figure 4:
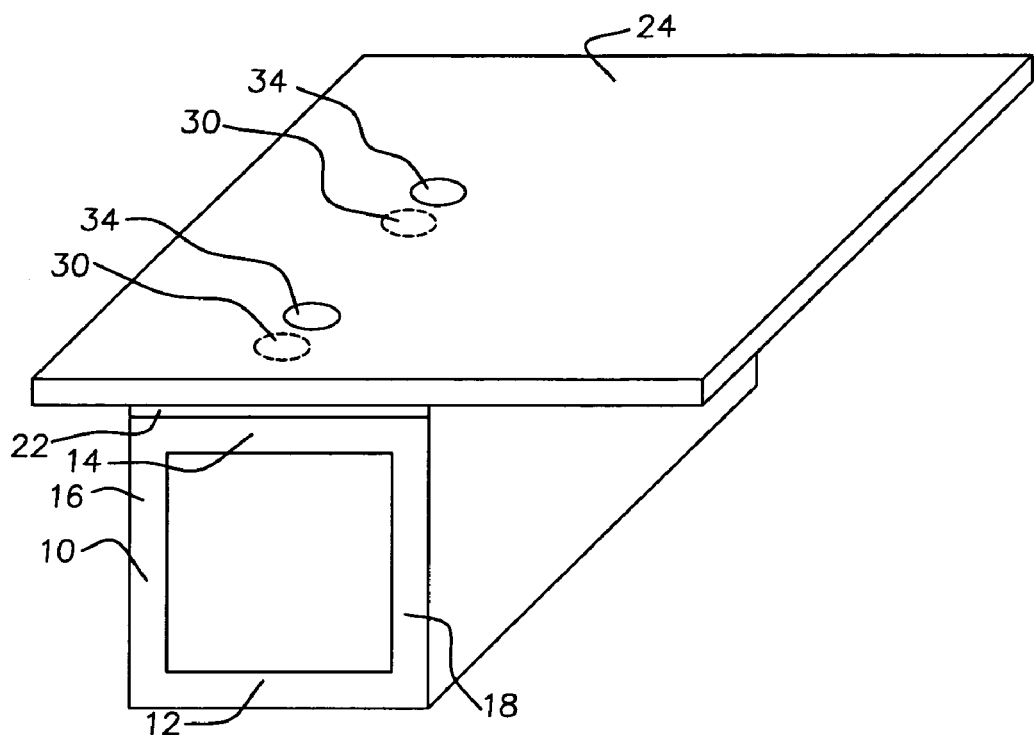
FIG. 4 is a perspective view showing adhesive spot bonds and resistance spot welds that have been formed along the length of the sheet and tube.

The following description of certain exemplary embodiments is merely exemplary in nature and is not intended to limit the invention, its application, or uses.

Referring to FIG. 1 it is seen that a rectangular hollow tube 10 includes a bottom wall 12, a top wall 14, a left wall 16, and a right wall 18. A coating of heat curable adhesive 22 has been dispensed along the outer surface of the tube top wall 14. A metal sheet 24 has been laid atop the tube 10 and the adhesive 22.

Referring now to FIG. 2 it is seen that an electrode 26 has been brought into contact with a spot on the metal sheet 24 and a backup electrode 28 has been positioned against the lower wall 12 of the tube 10. Electrical current is passed through the electrode 26 and passes through the sheet 24 and tube 10 to the backup electrode 28. The electrical current causes electric resistance heating of the metal sheet 24 and the top wall 14 of the tube, at least at the spot directly underlying the electrode 26. This heating will cure the adhesive 22 at least partially, to form an adhesive spot bond 30 between the sheet 24 and the tube wall 14.

Referring now to FIG. 3 the electrode 26 has been moved longitudinally along the sheet 24 so as to be at a distance from the adhesive spot bond 30. Electric current is passed through the electrode 26, at a voltage, current, and duration sufficient to form a resistance spot weld 34 between the sheet 24 and the tube top wall 14. It will be understood and appreciated that the electrode 26 is applied against the sheet 24 with considerable force as is customary in the formation of a resistance spot weld. The imposition of such a force by the electrode 26 would tend to bend the sheet 24 and the tube top wall 14 in the downward direction. However, it will be understood and appreciated particularly by referring again to FIG. 2, that the prior formation of the adhesive spot bond 30 between the sheet 24 and the tube wall 14 has created a two-ply structural member comprised of the sheet 24 and the top wall 14. This bonding together of the sheet 24 and the top tube wall 14 provides a load bearing structure that significantly stiffens both the metal sheet 24 and the top wall 14 against downward bending by the electrode force.

This stiffening of the sheet 24 and top wall 14 against bending is highly advantageous and contributes to improvements in the welding process and in the design of the sheet and tube structure. In particular, it will be appreciated that the stiffening effect of the adhesive bond 30 will enable the thickness of the top wall 14 of the tube to be of lesser thickness than would otherwise be required to resist bending. In addition, the stiffening of the sheet 24 and tube wall 14 against bending is advantageous in the welding together of either a galvanized or uncoated metal sheet to a galvanized tube 10. Because the formation of the adhesive bond between the sheet and tube stiffens the tube wall against bending, the sheet and tube experience more modest stress levels when the electrode pressure is removed at the end of the weld cycle, and therefore, the differing re-solidification temperatures of the zinc element of the galvanized coating and the iron element of the steel are accommodated consistent with obtaining high quality welds. Referring to FIG. 4 it is seen that the adhesive spot bonds 30 and the resistance spot welds 34 are provided in a pattern at spaced intervals along the length of the sheet and tube. In particular, as seen in FIG. 4, an adhesive spot 30 is provided adjacent to each site where a resistance spot weld 34 is to be formed. Any number of such patterns can be provided along the length of the sheet and tube interface.

Figure 5:
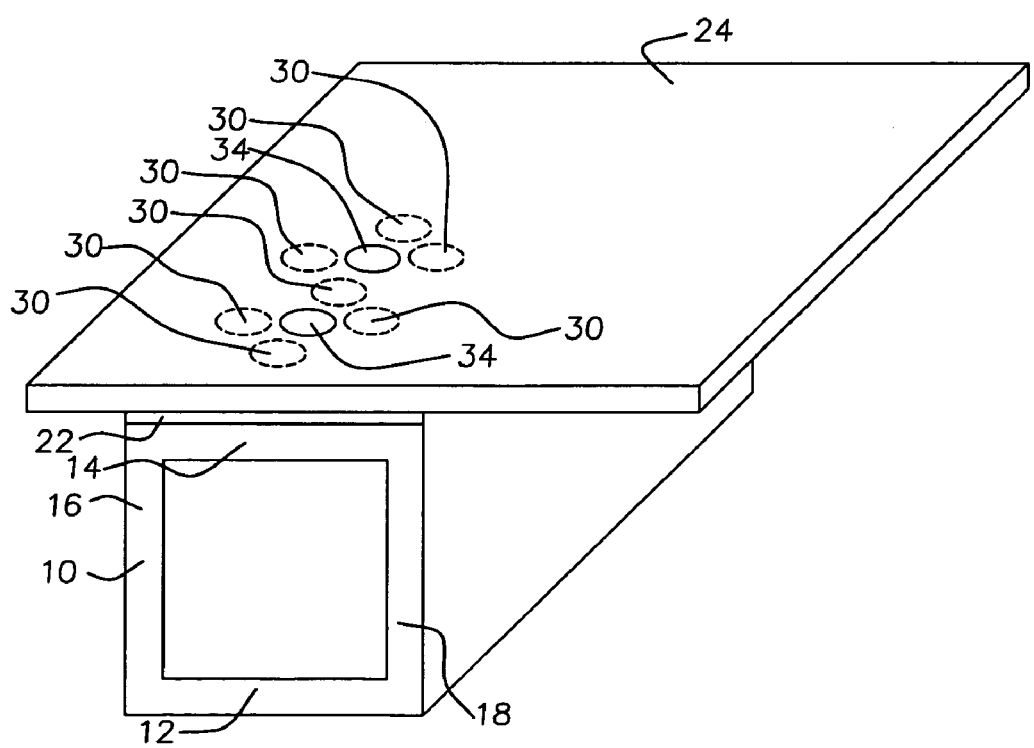
FIG. 5 is a view similar to FIG. 4 but showing that the several adhesive spot bonds have been formed in a pattern surrounding the location of the resistance spot weld.

Referring to FIG. 5 it is seen that the adhesive spot bonds 30 have been formed in a pattern that surrounds the resistance spot weld 34. In general, it will be desirable to employ larger numbers of cured adhesive spots in conjunction with relatively less thick wall thicknesses of the panel 24 and the tube top wall 14. In this way, the designer may choose to use lesser wall thickness of sheet and tube materials, and yet obtain high quality resistance spot welds, in order to provide light weight high strength structures.

It will be appreciated that the welding electrode 26 would be mounted on the end of a robot arm. A single electrode 26 can be moved along the sheet and tube to first perform the adhesive bonding step and then perform the resistance spot welding step. Alternatively, it may be desirable to use separate electrodes, one for the adhesive bonding step and a separate electrode for the resistance spot welding. Or, in the case of FIG. 5, it may be desirable to employ a gang of electrodes that are mounted on the robot for simultaneously forming several of the adhesive bonds at advance and stop of the robot along the length of the metal sheet and tube.

It may be desirable to move the electrode 26 along the length of the tube and form all of the adhesive bonds 30, and then have the electrode make a second pass along the length of the tube to form the resistance spot welds 34.

It will also be appreciated that the adhesive only needs to be sufficiently cured by the application of the electrode to introduce sufficient strength to stiffen the tube wall for the welding process. The final curing of the adhesive may occur during subsequent processing, for example the passage of the sheet and tube through an oven.

The foregoing description of the invention is merely exemplary in nature and, thus, variations thereof are intended to be within the scope of the invention. For example, although the foregoing description shows the electrode 26 to heat the heat curable adhesive and form the piece of spot bond 30, it may be desirable to use a torch or other heating method to form the adhesive spots 30.

In addition, although the drawings show the adhesive 22 as having be applied continuously along the surface of the tube wall 14, it may be more economical and efficient to simply dispense the adhesive only at spaced intervals or spots along the tube wall 14, at only those locations where it is intended to heat and form an adhesive spot bond 30. And rather than dispense the adhesive onto the tube, the adhesive may be dispensed onto the metal sheet. In either case, the adhesive becomes sandwiched between the metal sheet and the tube.

Furthermore, although the foregoing method is particularly desirable in the case of galvanized metals, it is also useful in the single-sided welding of uncoated metal sheets and tubes.

What is claimed is:

1. A method of improving a one-sided resistance spot weld between a metal sheet and a wall of a tube, comprising:
   dispensing heat curable adhesive between the abutting surfaces of the tube and the sheet;
   applying heat at a first spot on the sheet to at least partially cure the adhesive at that spot to thereby adhesively spot bond the metal sheet to the wall of the tube at the first spot;
   and thereafter applying an electrode to the sheet at a second spot spaced from the first spot and conducting weld current through the electrode to form a resistance spot weld at the second spot.

2. The method of claim 1 where the heat is applied to the first spot by applying an electrode to the sheet at the first spot and conducting current through the electrode to induce resistance heating of the sheet at the first spot and thereby at least partially cure the adhesive at the first spot.

3. The method of claim 2 in which the electrode is moved along the sheet and first used to cure the adhesive and then the same electrode is subsequently used to form the resistance spot weld.

4. The method of claim 1 in which the tube and the sheet extend longitudinally and a plurality of adhesive spot bonds and resistance spot welds are formed at longitudinal intervals along the tube and the sheet.

5. The method of claim 1 in which the heat curable adhesive is dispensed continuously along either the wall of the tube or along the sheet so that when the tube and the sheet are abutted to one another, the heat curable adhesive is sandwiched therebetween.

6. The method of claim 3 in which the heat curable adhesive is dispensed at selected spots along either the wall of the tube or along the sheet so that when the tube and the sheet are abutted to one another, the heat curable adhesive is sandwiched at spots therebetween.

7. The method of claim 1 in which any uncompleted curing of the heat curable adhesive is completed by passing the tube and the sheet through an oven.

8. The method of claim 1 in which at least one of the metal sheet and the tube are coated with a galvanized coating and the adhesive spot bonding of the sheet to the tube wall prevents the electrode from bending the sheet and the wall so that upon the melting and subsequent re-solidification of the galvanized coating, the coating will be evenly distributed.

9. The method of claim 1 in which a plurality of adhesive spot bonds are formed in a pattern around the second spot where the resistance spot weld is formed after the adhesive spot bonds are formed.

10. The method of claim 4 in which the same electrode is used to create resistance heating to cure the adhesive and also to form the resistance spot welds.

11. The method of claim 2 in which at least one of the sheet and the tube are galvanized with a zinc galvanic coating that is melted during formation of the resistance spot weld and the stiffening of the sheet and tube wall by the adhesive spot bond at the first spot prevents bending of the sheet and tube by the electrode and thereby assures uniform distribution of the melted zinc galvanic coating upon its re-solidification.

12. A method of improving a one-sided resistance spot weld between a metal sheet and a wall of a tube, comprising the steps of:
   first dispensing heat curable adhesive onto either the metal sheet or the wall of the tube;
   then abutting the metal sheet with the wall of the tube so that the heat curable adhesive is sandwiched between the metal sheet and the wall of the tube;
   then applying heat at a first spot on the sheet to at least partially cure the adhesive at that spot to thereby adhesively spot bond the metal sheet to the wall of the tube at the first spot so that the metal sheet and the wall of the tube are each stiffened against bending; and
   then applying an electrode to a second spot on the sheet that is spaced from the first spot and conducting weld current through the electrode to form a resistance spot weld at the second spot.

13. The method of claim 12 further comprising the heat curable adhesive being dispensed onto one of the metal sheet or the wall of the tube only at the location of the first spot on the sheet.

14. The method of claim 12 where heat is applied to the first spot to form the adhesive spot bond by applying the electrode to the first spot and conducting sufficient electric current therethrough to heat and at least partially cure the adhesive at the first spot.

15. The method of claim 12 in which at least one of the sheet and the tube are galvanized with a zinc galvanic coating that is melted during formation of the resistance spot weld and the stiffening of the sheet and tube wall by the previously formed adhesive spot bond prevents bending of the sheet and tube by the electrode and thereby assures uniform distribution of the melted zinc galvanic coating upon its re-solidification.

16. The method of claim 12 in which the heat curable adhesive is dispensed continuously along either the wall of the tube or along the sheet so that when the tube and the sheet are abutted to one another, the heat curable adhesive is sandwiched therebetween.

17. The method of claim 12 in which the tube and the sheet extend longitudinally and a plurality of adhesive spot bonds and resistance spot welds are formed at longitudinal intervals along the tube and the sheet.

18. The method of claim 12 in which the heat curable adhesive is dispensed at selected spots along either the wall of the tube or along the sheet so that when the tube and the sheet are abutted to one another, the heat curable adhesive is sandwiched at spots therebetween.

19. The method of claim 12 in which any uncompleted curing of the heat curable adhesive is completed by passing the tube and the sheet through an oven.

* * * * *